United States Patent
Furnanz et al.

(10) Patent No.: US 8,138,988 B2
(45) Date of Patent: Mar. 20, 2012

(54) OBJECT LOCATING APPARATUS, SYSTEM AND HIGH-GAIN, HIGH-SELECTIVITY ANTENNAE THEREFOR

(75) Inventors: Ken Furnanz, Eugene, OR (US); Thomas Shafer, Seattle, WA (US); Ian MacDuff, Lake Forest Park, WA (US)

(73) Assignee: AlpZite, LLC, Eugene, OR (US)

( * ) Notice: Subject to any disclaimer, the term of this patent is extended or adjusted under 35 U.S.C. 154(b) by 823 days.

(21) Appl. No.: 12/221,078

(22) Filed: Jul. 30, 2008

(65) Prior Publication Data
US 2010/0026578 A1 Feb. 4, 2010

(51) Int. Cl.
*H01Q 1/36* (2006.01)
(52) U.S. Cl. .................. 343/895; 342/419
(58) Field of Classification Search .............. 343/895; 342/418, 419
See application file for complete search history.

(56) References Cited

U.S. PATENT DOCUMENTS

| | | | |
|---|---|---|---|
| 5,525,967 A | 6/1996 | Azizi et al. | |
| 5,714,932 A | 2/1998 | Castellon et al. | |
| 6,067,018 A | 5/2000 | Skelton et al. | |
| 6,094,164 A * | 7/2000 | Murphy | 342/357.31 |
| 6,484,021 B1 | 11/2002 | Hereford et al. | |
| 6,587,080 B1 | 7/2003 | De Champlain et al. | |
| 6,788,199 B2 | 9/2004 | Crabtree et al. | |
| 7,002,473 B2 * | 2/2006 | Glick et al. | 340/572.1 |
| 7,248,933 B2 | 7/2007 | Wildman | |
| 7,308,274 B2 | 12/2007 | Mohl et al. | |
| 7,375,654 B2 * | 5/2008 | Culpepper et al. | 340/995.15 |
| 7,970,534 B2 * | 6/2011 | Loftus et al. | 701/208 |
| 2008/0106485 A1 * | 5/2008 | Huang et al. | 343/895 |
| 2011/0133961 A1 * | 6/2011 | Markovics | 340/988 |

OTHER PUBLICATIONS

Loc8tor, company web site, "LOC8TOR, Don't lose it, locate it!", http://loc8tor.com/, Apr. 16, 2009, Herts, United Kingdom.
Brickhouse Security, company web site, "Brickhouse Child Locator", http://www.brickhousesecurity.com/locator.html, Apr. 7, 2009, New York, NY.

* cited by examiner

*Primary Examiner* — Tho G Phan
(74) *Attorney, Agent, or Firm* — Ater Wynne LLP (57) ABSTRACT

The invented system includes a beacon affixed to the object subject to loss and a tracker held by the owner of the lost object, the tracker repeatedly, electronically 'interrogating' the beacon with a radio frequency (RF) signal, the beacon repeatedly responding to the interrogation, and the tracker effectively triangulating to determine the lost object's nominal location by a measure of distance and direction. In accordance with one embodiment of the invention, the tracker includes one or more antenna each coupled with a power amplifier to determine in real time the distance and direction of the beacon from the tracker. In this embodiment, the tracker indicates both distance and direction of the object-affixed beacon to the tracker-holding owner via a simple color-coded light array. In one embodiment of the invention, the invented antenna of which there is one (or more) includes a helically wound conductor of elliptical cross section disposed around the hollow interior surface of a hollow mandrel.

91 Claims, 7 Drawing Sheets

OBJECT LOCATING APPARATUS, SYSTEM AND HIGH-GAIN, HIGH-SELECTIVITY ANTENNAE THEREFOR

FIELD OF THE INVENTION

The invention relates generally to the field of locating lost objects. More particularly, the invention relates to locating lost objects that are mobile, i.e. that may be in motion while they are lost or may be initially in motion and thereafter stationary but nevertheless lost. Family pets are an example of mobile objects subject to loss, as are skis, cell phones, skis, briefcases, cameras, etc.

BACKGROUND OF THE INVENTION

Pets sometimes become lost to their owners. Most lost dogs are found on the ground within a dozen blocks (a ~1 mile radius) of home, whereas most lost cats are found hiding under something within a few houses (a several dozen foot radius) of home. Locating a lost pet quickly and easily saves lives and much anxiety for pets and owners alike.

Pet ID implants are known to assist in identifying and contacting a lost-and-found pet's owner; they do not assist in locating lost pets or other lost mobile objects.

Global Positioning System—(GPS)-based tracking systems are bulky and relatively expensive. Moreover, they rely on satellites, servers, and third-party software services via subscription for costly and latency-delayed mobile object tracking. As such, they are prohibitively costly and cumbersome for use in locating lost pets or other tangibly inexpensive lost mobile objects.

DETAILED DESCRIPTION OF THE PREFERRED EMBODIMENTS

Locating lost mobile objects such as family pets does not require expensive global positioning satellite (GPS) devices and Internet software tracking and reporting tools.

A system is proposed that robustly, intuitively, inexpensively, reliably, and durably indicates to an owner of a mobile lost object the mobile lost object's distance and direction from the owner, effectively guiding the owner to recover the mobile lost object. Those of skill in the art will appreciate, of course, that the invention can be used to locate immobile lost objects. The invented system includes a beacon affixed to the object subject to loss and a tracker held by the owner of the lost object, the tracker repeatedly, electronically 'interrogating' the beacon with a radio frequency (RF) signal of known nominal frequency, the beacon repeatedly responding to the interrogation, and the tracker effectively 'triangulating' (via relative values rather than absolute values) to determine the lost object's nominal location by a measure of distance and direction of the beacon, relative in space and time, relative to the tracker.

In accordance with one embodiment of the invention, the tracker uses a single antenna to indicate relative orientation-based signal strength to the user. By navigating his or her orientation during the lost-object search, based at least in part on the signal strength indicator, a user progressively improves the signal strength by seeking a travel orientation that maximizes average signal strength over time and that effectively guides the user to the lost object.

In accordance with another embodiment of the invention, two or more spaced-apart trackers, both indicating relative signal strength from the same remote beacon, can be used effectively to triangulate the orientation and location of the beacon. The use of two or more trackers, by two or more proximate users, and coordination between the users of their respective trackers' signal strength indication also obviates the requirement of two or more antennae per tracker.

In accordance with yet another embodiment of the invention, the tracker includes two or more separated angularly offset axial antennae coupled with power and low-noise amplifiers to determine in real time the distance and direction of the beacon from the tracker. In this embodiment, the tracker indicates both distance and direction of the object-affixed beacon to the tracker-holding owner via a simple color-coded light array.

In any of the various embodiments of the invention described herein, the invented antennae of which there is one (or more) includes one or more of either a simple Yagi array-type antenna extending forwardly from a grip or handle portion of the tracker or a helical-type antenna including a helically wound mandrel of elliptical cross section extending forwardly from a grip or handle portion of the tracker's housing. Those of skill in the art will appreciate that the user's hand grip of the tracker's housing preferably substantially and more preferably entirely is positioned behind the active and passive elemental portions of the antenna to reduce signal reduction/interference from the human's anatomy on the antenna's reception.

(In accordance with another embodiment of the invention, the tracker includes a single antenna, implemented in hardware or software, operatively coupled with an accelerometer or digital compass, effectively triangulating the location of the lost object by known trigonometric and other formulaic principles known to those of skill in the art.)

Figure 1A:
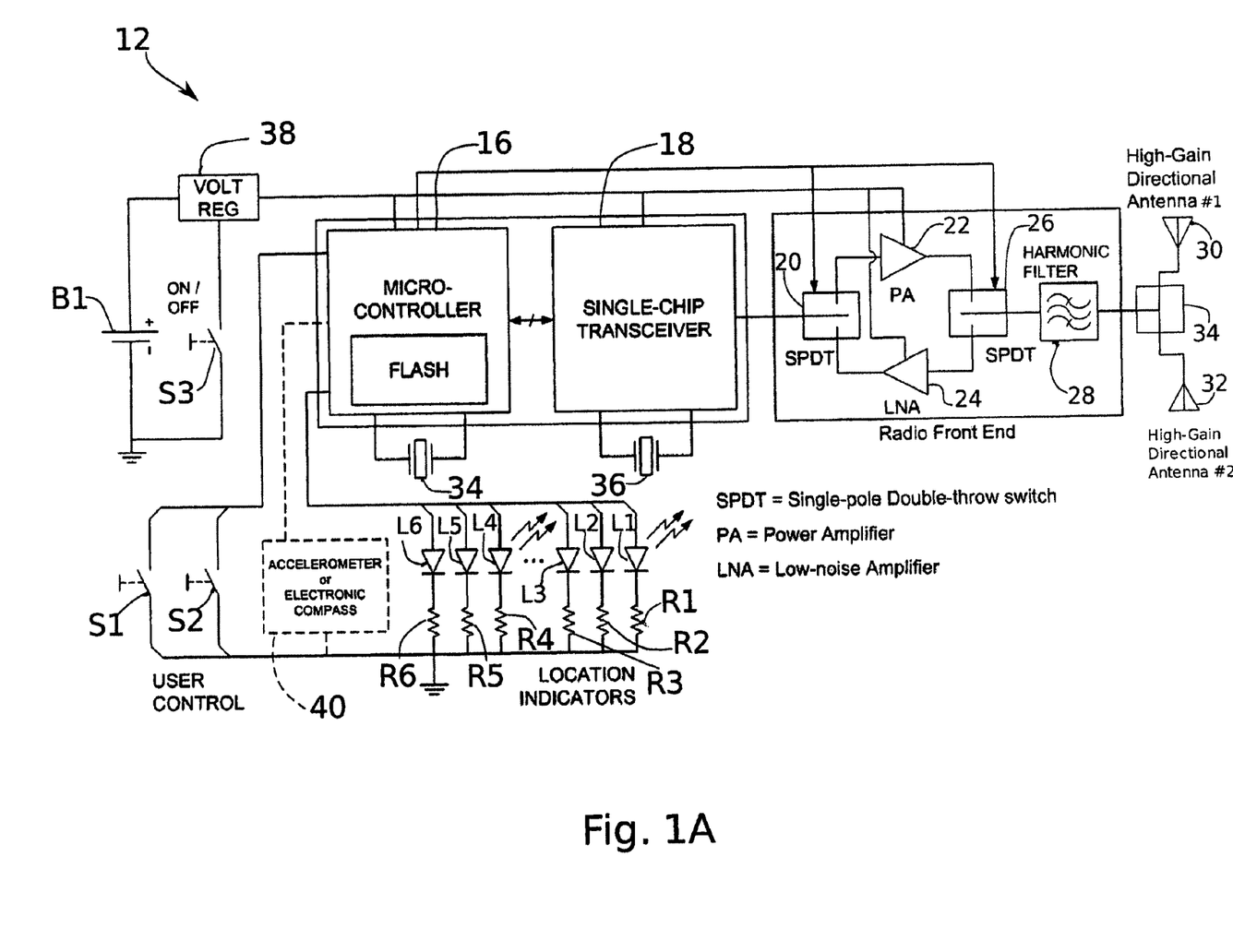
FIGS. 1A and 1B collectively are a schematic system block diagram of the invention in one of its embodiments, FIG. 1A featuring a tracker and FIG. 1B featuring a beacons responsive thereto.
Figure 1B:
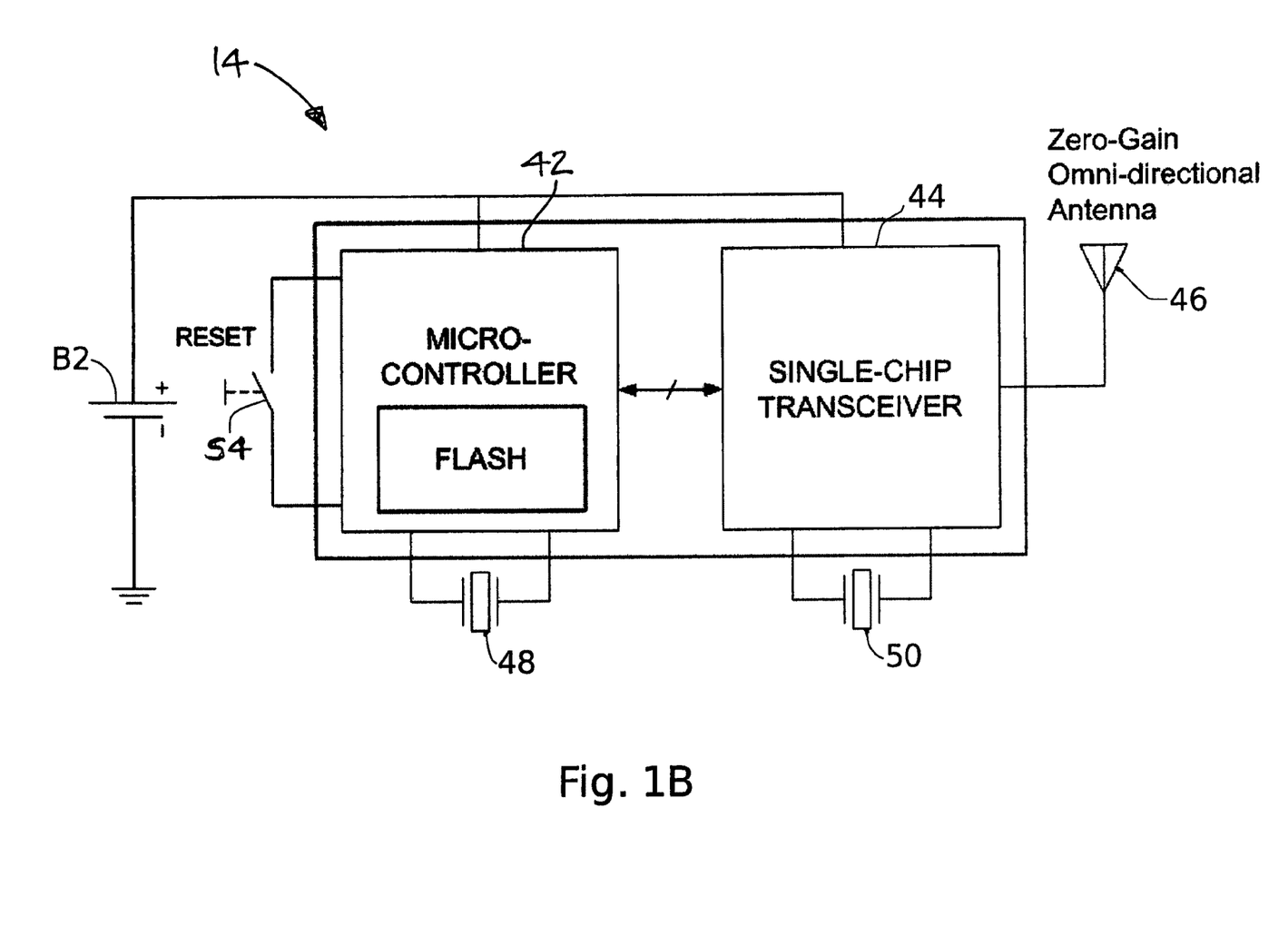

FIGS. 1A and 1B schematically illustrate invented system 10 in block diagram form, FIG. 1A featuring a tracker 12 and FIG. 1B featuring a beacon 14 responsive thereto. Those of skill in the art will appreciate that tracker 12 in accordance with one embodiment of the invention emits a query signal from a antenna, the query signal being receivable by the beacon 14, which in response emits a response signal from an antenna to tracker 12. In this embodiment, the query signal effectively 'awakens' beacon 14 from its dormant, battery-save 'sleep' mode so that it begins periodically to emit a locational signal for tracking and locating purposes. In accordance with another embodiment of the invention, beacon 14 is always on and emitting a locational signal such that it can be tracked and located by beacon 12 responsive to the locational signal.

In accordance with the invention, tracker 12 includes a beacon microcontroller 16, a beacon transceiver 18, a single-pull/double-throw (SPDT) internal switch 20, a power amplifier (PA) 22, a low-noise amplifier (LNA) 24, a second SPDT internal switch 26, a harmonic filter 28, and one or more high-gain, directional antennae such as antenna 30. (Two such high-gain, directional antennae having divergent central transmission/reception axes within the spirit and scope of the invention could be used to provide two-dimensional (2D) tracking and locating of lost objects by way of indicating to the user of tracker 12 both distance and direction. On the other hand, one such high-gain, directional antenna operatively coupled with a digital compass or accelerometer effectively could accomplish the same purpose as two angularly divergent antennae. Moreover, three such high-gain, directional antennae within the spirit and scope of the invention could be used to provide three-dimensional (3D) tracking and locating, although the type of two-dimensional (2D) tracking described herein has been found to be very effective in locating lost mobile objects in relatively flat terrain whether urban or rural. Thus, any suitable configuration of one or more antennae is within the spirit and scope of the invention.)

Those of skill in the art will appreciate that one or more antenna 30 in accordance with one embodiment of the invention is a Yagi-Uda-type (hereinafter, simply Yagi), so-called 'patch' antenna characterized by high directivity and gain, as will be seen by reference to FIGS. 2A and 4. Those of skill in the art also will appreciate that one or more antenna 30 in accordance with another embodiment of the invention is a helical antennae having an elliptical cross section also characterized by high directivity and gain, as will be seen by reference to FIGS. 2B and 4.

Those of skill in the art will appreciate that tracker 12 in accordance with one embodiment of the invention further includes two suitably tuned crystal oscillators 34 and 36 operatively coupled, respectively, with microcontroller 16 and transceiver 18, to supply a stable time-base or master clock signal thereto. Those of skill in the art also will appreciate that tracker further includes a battery B1 and an associated voltage regulator 38 for supplying stable direct current (DC) power to the electronic components of tracker 12. Battery B1 can be any suitable, long-life, preferably compact or miniature so-called 'button' battery of type lithium ion or the like. Alternatively, it may be one or more series- or parallel-connected mini "flashlight" batteries, e.g. of AA or smaller or larger form-factor and power capacity.

Those of skill in the art will also appreciate that a display including two or more color-coded location/direction lights or indicators such as two spaced-apart arrays of two or more light-emitting diodes (LEDs) L1-L6 each are used in accordance with the invention to indicate to the user of tracker 12 the direction and location of a beacon 14 being located. The rear column and front row of indicator lights will be understood by reference to FIG. 3 to be described below. In accordance with one embodiment of the invention, the indicators serve a dual purpose of indicating in the alternative the direction and thus ultimate location of beacon 14 as well as the remaining power of battery B1. LEDs L1-L6 typically have current-limiting resistors R1-R6 in series therewith, as is known. Those of skill in the art will appreciate that more or fewer LEDs and associated series resistors can be included in any suitable configuration as a visual indication of direction/location, battery power remaining, and/or any other operational characteristic of tracker 12. Finally, external user-control switches such as two or more pushbutton switches S1, S2, and S3 in accordance with the invention are included in tracker 12 to facilitate power-on/off (thus preserving power for battery B1 during non-use of tracker 12), and user input and operational or diagnostic mode control thereof as will be described below by reference to FIG. 3.

Beacon microcontroller 16 having a microprocessor and memory therein, as is known, is suitably programmed or otherwise configured to monitor beacon transceiver 18 indicative of received signals from the antennae, to monitor user-control switches S1, S2, and S3; to control internal switches 20 and 26; and to drive LEDs L1-L6. The program can be burned or masked into programmable read-only memory (PROM) or into a programmable logic array (PLA), or otherwise stored in non-volatile storage in the form of instructions and data processed by the microprocessor, as is known.

In accordance with an alternative embodiment of the invention, an accelerometer or electronic compass 40 is provided in tracker 12 to obviate the need for more than one high-gain directional antenna 30. Those of skill in the art will appreciate that accelerometer/electronic compass 40 effectively can be used in combination with a single, high-gain, directional antenna 30 to determine direction and ultimately location of beacon 14 by complementing the data obtained by beacon microcontroller 16 from the single antenna 30. Those of skill in the art will appreciate that beacon microcontroller 16 would utilize single-point (as opposed to parallax dual-point) data from the single antenna along with acceleration/direction date from accelerometer/electronic compass 40 mathematically to derive direction/location information regarding the whereabouts of beacon 14, thereby actively to "guide" the user's directional orientation and effectively to improve the efficiency of the search for the lost object.

Those of skill in the art also will appreciate that, in accordance with an alternative embodiment of the invention, one or more of antenna 30 can be implemented at least in part in software or firmware instead of in hardware. For example, triangulation methods can be implemented in software or firmware given signal power strength data from a simple, omni-directional antenna, based upon changes over known time intervals in orientation of tracker 12 in accordance with known principles and mathematical relationships between location, velocity, orientation, acceleration, and time. Any and all such alternative embodiments and configurations are contemplated as being within the spirit and scope of the invention.

Referring next to FIG. 1B, beacon 14 in accordance with one embodiment of the invention includes a beacon microcontroller 42, a beacon transceiver 44, and a zero-gain, omni-directional antenna 46. Those of skill will appreciate that beacon 14 includes beacon crystal oscillators 48, 50 respectively providing master clock or time-base signals to beacon microcontroller 42 and beacon transceiver 44. Those of skill in the art will appreciate that beacon 14 also includes a beacon battery B2 that supplies DC power to the electronic components. Battery B2 can be any suitable, long-life, preferably compact or miniature so-called 'button' battery of type lithium ion or the like. Finally, those of skill in the art will appreciate that beacon 14 includes a momentary pushbutton reset switch S4 the use of which will be described below by reference to FIG. 3.

Those of skill in the art will appreciate that beacon 14 typically is simpler and lighter in weight than is tracker 12. This is an advantage because beacon 14 typically is affixed to a pet or other lightweight mobile object that preferably is relatively unburdened by the beacon. Thus, a kitten, small cat, puppy, small dog or other pet can wear a collar housing beacon 14 or a self-contained beacon 14 separate therefrom without undue burden. The electronics featured in beacon 14 in accordance with the invention is simplified to reduce circuit complexity, component count, cost, and weight. A single omni-directional antenna that is tuned for reception to a nominal center frequency of a query signal from tracker 12 (or to a trigger signal from a perimeter fence) and that is tuned for transmission to a nominal center frequency of a response signal to tracker 12 (or the perimeter fence) suffices for purposes of direction/location tracking in accordance with the invention.

Microcontroller 42 of beacon 14 is suitably programmed to respond to query signals received by transceiver 44 via antenna 46 by periodically transmitting a signal capable of being received by a remotely located tracker 12 such as that described above. Those of skill in the art will appreciate that microcontroller 42 is programmed to execute instructions within its internal memory that cause it to monitor reset button S4, to monitor signals received by the receiver section of transceiver 44, and to transmit via the transmit section of transceiver 44 and antenna 46 signals receivable by a remote tracker 12.

Thus, tracker 12 and beacon 14 cooperate over distances of more than 1.0 miles in establishing communication and guiding a user of tracker 12 along either a straight-line or serpentine path toward beacon 14 affixed to a lost, mobile object that is to be located by system 10. Those of skill in the art will appreciate that it is the combination of one or more high-gain, directional antennae antenna 30 in tracker 12, and one or more of PA 22 and LNA 24 that provides the needed directional and signal power level sensitivity needed to locate a lost object using lightweight portable RF devices. Thus, power and range are increased by approximately a factor of five over conventional battery-powered, antenna-only, compact RF-based locator systems.

In accordance with one embodiment of the invention, the nominal center radio frequency used is FCC-approved 2.453 gigahertz (GHz), although it will be understood that alternative frequencies can be used to better or worse tracking and locating effect. Of course, within the spirit and scope of the invention, beacon 14 can be differently configured to have more or fewer components and/or complexity at higher or lower performance and, typically, cost. Such alternative embodiments are contemplated as being within the spirit and scope of the invention.

For example, as battery technologies and life expectancies improve, it may be possible to program microcontroller 42 of beacon 14 periodically to emit a locational signal without an initial "wake up" query signal from tracker 12, while preserving a reasonable life expectancy of battery B2 therein. It also may be possible to recharge even a relatively lower-power-capacity battery B2 of beacon 12 periodically so that it is always or nearly always at full charge. This might require a discipline on the part, for example, of a pet owner whereby temporary removal from the pet of the beacon to re-charge the battery represents an acceptable risk of loss of the pet and an acceptable burden (e.g. because it becomes routine as when the pet is regularly, periodically fed or bathed). Thus, the invention is not limited to the query/response or other wake-up or battery-save modality, but instead can avoid such a requirement, yet within the spirit and scope of the invention.

Figure 2A:
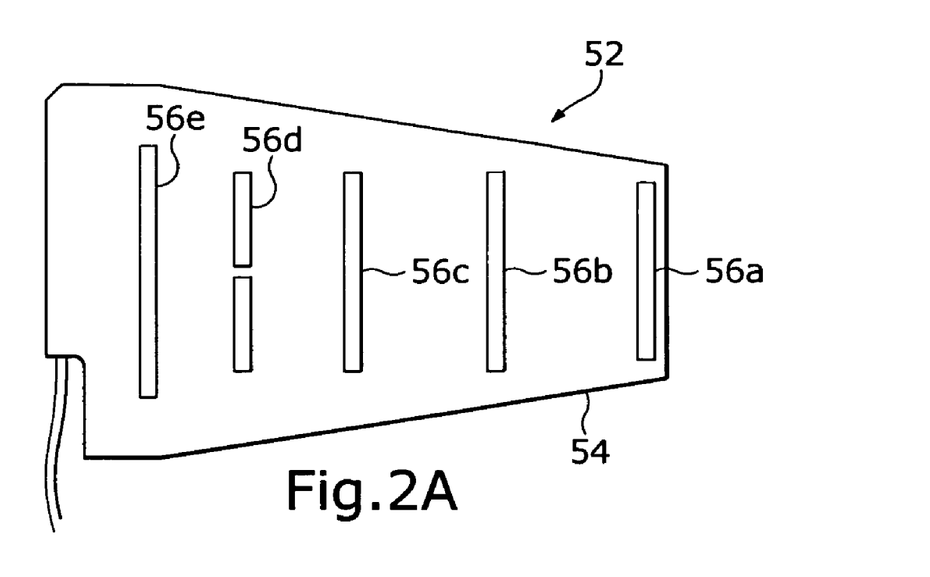
FIGS. 2A and 2B are isometric views of the two invented directional antennae used in the alternative in the tracker of FIG. 1A.
Figure 2B:
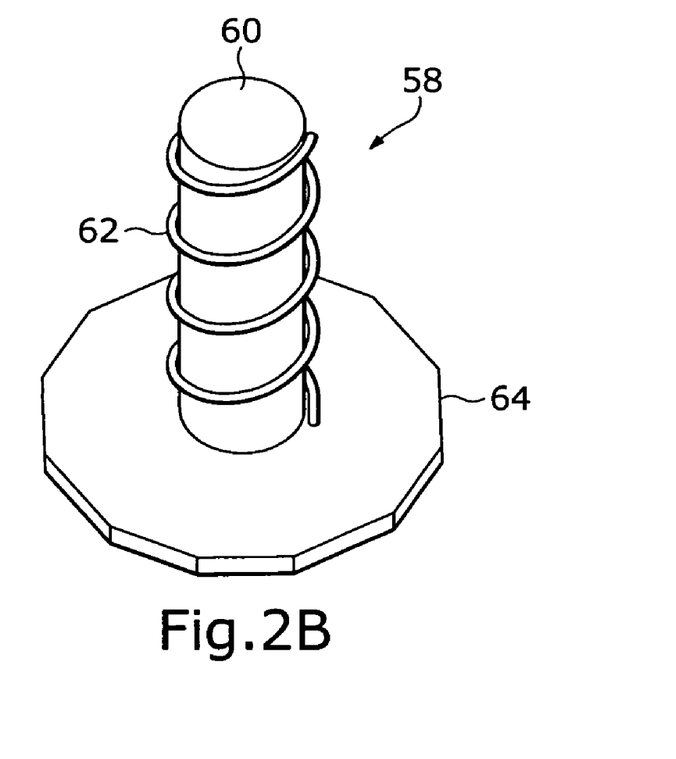

FIGS. 2A and 2B are isometric views of the two invented directional antennae used in the alternative in tracker 12 of FIG. 1A. Those of skill in the art will appreciate that FIG. 2A illustrates a Yagi array antenna configuration and that FIG. 2B illustrates a helical-elliptical antenna configuration, either of which has been discovered to provide adequate gain and directivity to realize the advantages of the present invention. Those of skill also will appreciate that the high-gain directional antenna configurations shown in FIGS. 2A and 2B represent, for example, one or antennae 30 and 32 of FIG. 1A, the other of which may be identically specified.

Yagi array antenna 52 shown in FIG. 2A is of conventional design and will be understood to include an insulative mast 54 that mounts plural (e.g. five) suitably spaced-apart, linear reflector, active and director elements including reflector (R) element 56a, active (A) element 56b, and plural director (D) elements such as director elements 56c-56e. Antenna 56 in accordance with one embodiment of the invention is in planar form and is connected to the other electronic components of tracker 12 (see FIG. 1A) via a low-loss semi-rigid coaxial cable. Those of skill in the art will appreciate that elements 56a-56e and their spacings are dimensioned as is known relative to mast 54 optimally to receive the query signal and/or optimally to transmit the locational signal. Those of skill in the art also will appreciate that Yagi array antenna 52 has linear polarization but good efficiency, good gain, low cost and repeatable performance. Preferably, Yagi array antenna 52 including at least the above listed elements 56a-e is combined with the remaining electronic components of tracker 12 on the same printed circuit board (PCB), and may even use the PCB body itself as mast 54. More or fewer deflector elements 56c-e with suitable length and spacing therebetween will be understood respectively to increase or decrease gain and directivity, which with a Yagi array antenna, is only moderate.

In accordance with one embodiment of the invention, Yagi antenna 30 yields approximately 8 decibels (8 db) of gain without resort to additional deflector elements 56f and 56g. Also in accordance with one embodiment of the invention, the addition of deflectors 56f and 56g yields an overall gain of approximately 12 db. This is with the Yagi antenna extending approximately 4-7 inches forward of the electronics within the tracker's housing. Those of skill in the art will appreciate that 4 inches represents the forward extent of the basic "on-board" antenna element array and that 7 inches represents the forward extent of the added "out-board" antenna element array, in accordance with one embodiment of the invention.

Thus, additional deflector elements can be included for improved directional gain. Importantly, the additional deflector elements are not electrically connected to the other elements 56a-56e of antenna 52. This creates an opportunity to extend directivity of an antenna by extending the antenna in the field with a snap-fit or flip-hinge or telescopic antenna extender portion containing additional deflector elements that electrically complement integral and electrically intercononected elements 56a-56e contained within the tracker housing. This will be described in more detail below by reference to FIG. 5.

FIG. 2B shows a higher performance and higher cost alternative to the Yagi array antenna of FIG. 2A. A helical antenna 58 having an elliptical cross section is shown in isometric view to include a hollow or solid mandrel 60 around which a conductor, e.g. a somewhat malleable conductive wire or simply conductor, 62 is wound A generally elliptical ground plane 64 is provided concentric with the central axis of mandrel 60 preferably in the plane of an outside (printed) surface of a PCB (not shown), the elliptical ground plane being of substantially greater diameter than that of mandrel 60, as shown. A distal end of conductor 62 preferably extends through an insulative shoulder through the ground plane and is operatively connected to an appropriate circuit component, for example, on the other side of the PCB.

Those of skill in the art will appreciate that circular polarization in a directional antenna tends to compensate for signal loss caused by scattering. Thus, circular polarization is preferred in accordance with one embodiment of the invention. Nevertheless, other forms of polarization are contemplated as being also within the spirit and scope of the invention.

In accordance with one embodiment of the invention, helical-elliptical antenna 58 antenna is tuned to receive at a defined nominal (free space) wavelength $\lambda_0$, and thus the circumference of the elliptical cross section of the antenna are dimensioned between approximately $0.25\ \lambda_0$ and $1.75\ \lambda_0$. More preferably, of course, the circumference of the elliptical cross section is dimensioned between approximately $0.5\ \lambda_0$ and $1.5\ \lambda_0$. Ideally, the circumference of the elliptical cross section is dimensioned to be $1.0\ \lambda_0$. Those of skill in the art will appreciate that directivity can be increased by the use of more helical turns of conductor 62, which adds roughly 1.0 decibel (db) of overall gain (directivity) per turn. The angular pitch of the helical conductor 62 turns around mandrel 60 determines the width of the main-lobe and side-lobe levels (to be described below by reference to FIG. 4). It is has been discovered that approximately 14 degrees of pitch is optimum. Those of skill in the art will appreciate that alternative dimensions can nonetheless produce useful results. Thus, all suitable alternative antenna configurations, dimensions, turn numbers, winding pitches, and tolerances are within the spirit and scope of the invention.

Those of skill in the art will appreciate that the number of conductor windings of helical-elliptical antenna 58 can be extended in a manner similar to that described above for Yagi antenna 56. Thus, a snap-fit or flip-hinge or telescopic antenna extension can increase the gain also of helical-elliptical antenna 58. Importantly, the conductor winding should be mechanically durable and electrically contiguous, as will be understood by those of skill in the art.

It has been discovered that "squashing" the circular cross section of a helical antenna into an elliptical cross section has surprising benefits regarding antenna direcitity and performance. Moreover, such squashing is consistent with form-factor considerations for applications like tracker 12, which is preferably lightweight and relatively flat so that it is easily gripped at its handle end in a user's pahn. In accordance with one embodiment of the invention, the ratio of the major axis to minor axis of the elliptical cross section of the helical antenna is greater than ~3:1 and preferably greater than ~5:1. Thus, the squashing of a cylindrical helix into an elliptical shape results in what will be referred to herein as a "low-profile" antenna that exhibits improved directivity (narrowing the beamwidth) of the pattern in the plane of the long dimension, e.g. the major axis of the ellipse), which is useful especially in a planar, right angle antenna configuration consistent with PCB mounting and planar orientation within a relatively flat housing of tracker 12 (refer briefly to FIG. 3).

In accordance with one embodiment of the invention, an 'inverse' mandrel configuration of helical-elliptical antenna 58 utilizes a hollow mandrel or other tube-like structure having electrically insulative characteristics, and winds the conductor helically along an interior surface thereof. This effectively utilizes the tube as a mandrel in terms of forming the helix, while also protecting the malleable conductive helix within the tube's hollow interior wall. Those of skill in the art will appreciate that, alternatively, the helical antenna can be patterned and printed (using ink-jet or laser printing or masking and patterning and deposition or other techniques) on an interior or exterior surface of the mandrel to render the helical antenna somewhat less fragile and somewhat more durable.

Figure 3:
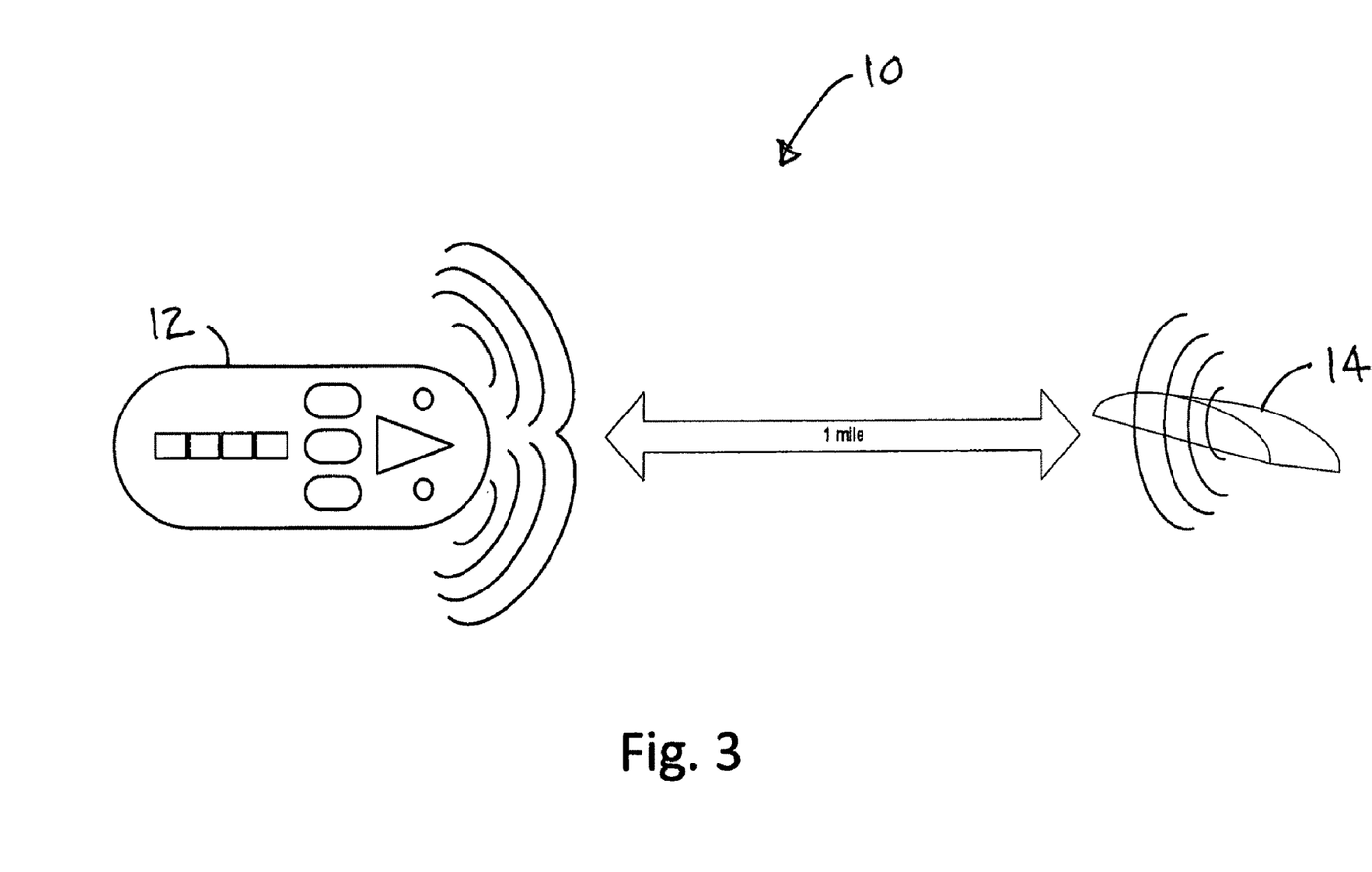
FIG. 3 is an isometric view of the tracker and beacon of FIG. 1 in accordance with one embodiment featuring a dual-purpose display on the tracker and a power indicator on the beacon.

FIG. 3 is an isometric view of the tracker-and-beacon system of FIG. 1 in accordance with one embodiment featuring a dual-purpose display on the tracker. FIG. 3 is largely deemed self-explanatory, and will be described only in pertinent detail. Tracker 12 is shown in RF transceiver communication with beacon 14. It may be seen from FIG. 3 that tracker 12 and beacon 14 further include suitably compact housings 66 and 68 (respectively) around the electronics shown in FIGS. 1A and 1B. In accordance with one embodiment of the invention, the volume of tracker 12 is only approximately between three and five cubic inches (3-5 in$^3$), and that of beacon 14 is only approximately 1 in$^3$, providing both components with very high functional density. Preferably, housing 68 is submersion-water-resistant and housing 66 is merely water-repellent, thus accommodating their different anticipated environments (in which a pet owner may be searching the rain for a pet that is at least partially submerged in a creek). Housing 68 provides a port (not shown) for recharging battery B2, although such charging port need not represent an external physical port but may instead permit proximity battery recharging. Housing 66 provides a port (also not shown) for recharging battery B1. Housing 66 further provides three (pushbutton) switches S1, S2, and S3 and two arrays of two LEDs L1-L6 each on an external surface thereof to provide a user interface with tracker 12.

Those of skill in the art will appreciate that a grippable portion of the tracker housing is behind the tracker's forwardly extending antenna portion, as described and illustrated herein. Moreover, in accordance with one embodiment of the invention, the battery array and electronic circuitry of the tracker are overlaid thereby to minimize the footprint and to maximize the functional density of the tracker.

Those of skill in the art also will appreciate that the beacon is very compact to render it compatible with being worn by small pets without undue burden. For example, in accordance with one embodiment of the invention, the housing for the beacon is less than approximately 0.5 inch in terms of the largest measurement in the narrowest dimension thereof, e.g. its height. More preferably, it is less than approximately 0.4 inch. In terms of volume, the beacon is less than approximately 2.5 in$^3$, more preferably less than approximately 1.5 in$^3$, and most preferably less than approximately 1.0 in$^3$, thereby maximizing the beacon's functional density while retaining its light weight and small footprint.

In use, tracker 12 first is turned on and 'trained' or 'homed' or 'paired' to up to three different beacons 14, for example, by depressing one of pushbutton switches S1 and S2. It can thereafter be used to find any one or more of the three 'paired' beacons if they should be affixed to one or more lost mobile objects. To locate a lost mobile object, tracker 12 is aimed randomly or experientially (e.g. to locate a previously lost pet who has a certain predilection for heading off in a certain direction) until a query is responded to by the remote beacon 14. This is determined by watching the forward row of LEDs (which preferably are arrayed in the shape of a T, with the row representing the cross and the column representing the upright or leg thereof), until one or more of them is illuminated (e.g. a left yellow light would mean turn right, a right yellow light would mean turn left, a middle green light would mean proceed straight). The rearward column of LEDs can be illuminated progressively in number or continuity (or both) to indicate the lost mobile object's increasing or decreasing proximity to the tracker. The progressive and periodic illumination of more than one LED in each array of LEDs is used in accordance with one embodiment of the invention to indicate proximity between beacon and tracker: the more LEDs illuminated and the steadier the illumination thereof, the closer the tracker to the beacon. As described above, the other pushbutton switch S2 can be depressed to check the reserve power level of battery B1 in tracker 12.

Those of skill in the art will appreciate that it is possible, within the spirit and scope of the invention, for tracker 12 to sense (additionally or alternatively) the reserve power level of the battery in beacon 14. This can be accomplished via digital communications between beacon 14 and tracker 12 in accordance with a defined protocol by which a digitized code representing reserve battery power level in the beacon is appended with a unique status code or identifier by the beacon and the data packet containing the representation of power level is transmitted from the beacon 14 to remote tracker 12. In turn, remote tracker 12 could be equipped with a second reserve power level indicator for informing the user of tracker 12 of the reserve power level of battery B2 in beacon 14.

Those of skill in the art will appreciate that a mirror-image scheme can be used to enable each of one or more beacons to identify each of one or more trackers.

Other digital telecommunications between tracker 12 and beacon 14 are contemplated, within the spirit and scope of the invention. For example, a unique beacon and/or tracker ID can be conveyed using any desired coding or data packetizing conventions including forward error correction, encryption, and the like. The microprocessors within tracker 12 and beacon 14 straightforwardly can be programmed to transmit, receive, decode, and process such data. Moreover, it is discovered that there is a data rate v. power/range tradeoff in such telecommunications that suggests a deliberate design choice that comprehends the intended telecommunications range, antenna and associated receiver circuitry gain and directivity, battery power/life, etc. For example, a 10 kilobit/second (10 kbps) data rate at 2.42 GHz RF signaling represents a good compromise between receiver sensitivity and user interface latency or delay. Such tradeoffs and considerations are contemplated as being within the spirit and scope of the invention.

Those of skill will appreciate that, within the spirit and scope of the invention, alternative switching and indicating procedures can be used, or different indicator light or switch arrays and functions can be realized, all within the spirit and scope of the invention.

Figure 4:
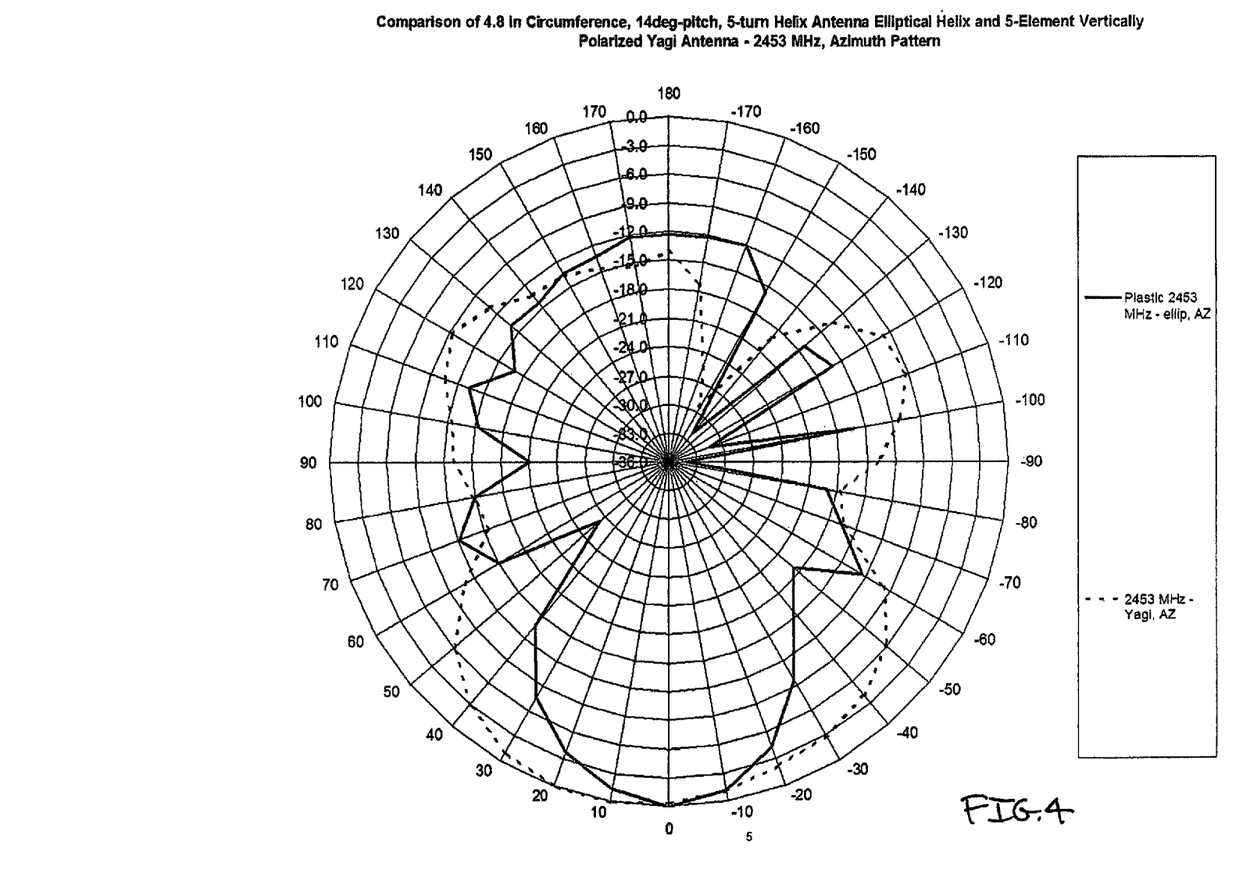
FIG. 4 is a polar phase diagram comparing the attenuation (inverse gain) of a Yagi array and a helical-elliptical antenna useful in accordance with the invention.

FIG. 4 is a polar phase diagram (with negative attenuation, or gain, indicated progressively along concentric circles as decibel levels) illustrative of the level of attenuation (inverse gain) of an azimuth (AZ) Yagi array and an azimuth (AZ) helical-elliptical antenna made in accordance with the invention. The phase diagram is believed to be largely self-explanatory to those of skill in the art. (The polar phase plots represent experimental results under less than ideal conditions, thus the asymmetries around the 0-180° centerline.) It can be seen from the diagram that the half-power beam-width of the Yagi array antenna is approximately seventy degrees (70°) and the half-power beam-width of the helical-elliptical antenna is approximately thirty-five degrees (35°). Thus, those of skill in the art will appreciate that the helical-elliptical antenna is approximately twice as directive (directionally selective) as the Yagi array antenna, while as discussed above it is abundantly clear that either works to advantage in accordance with the invention.

Figure 5:
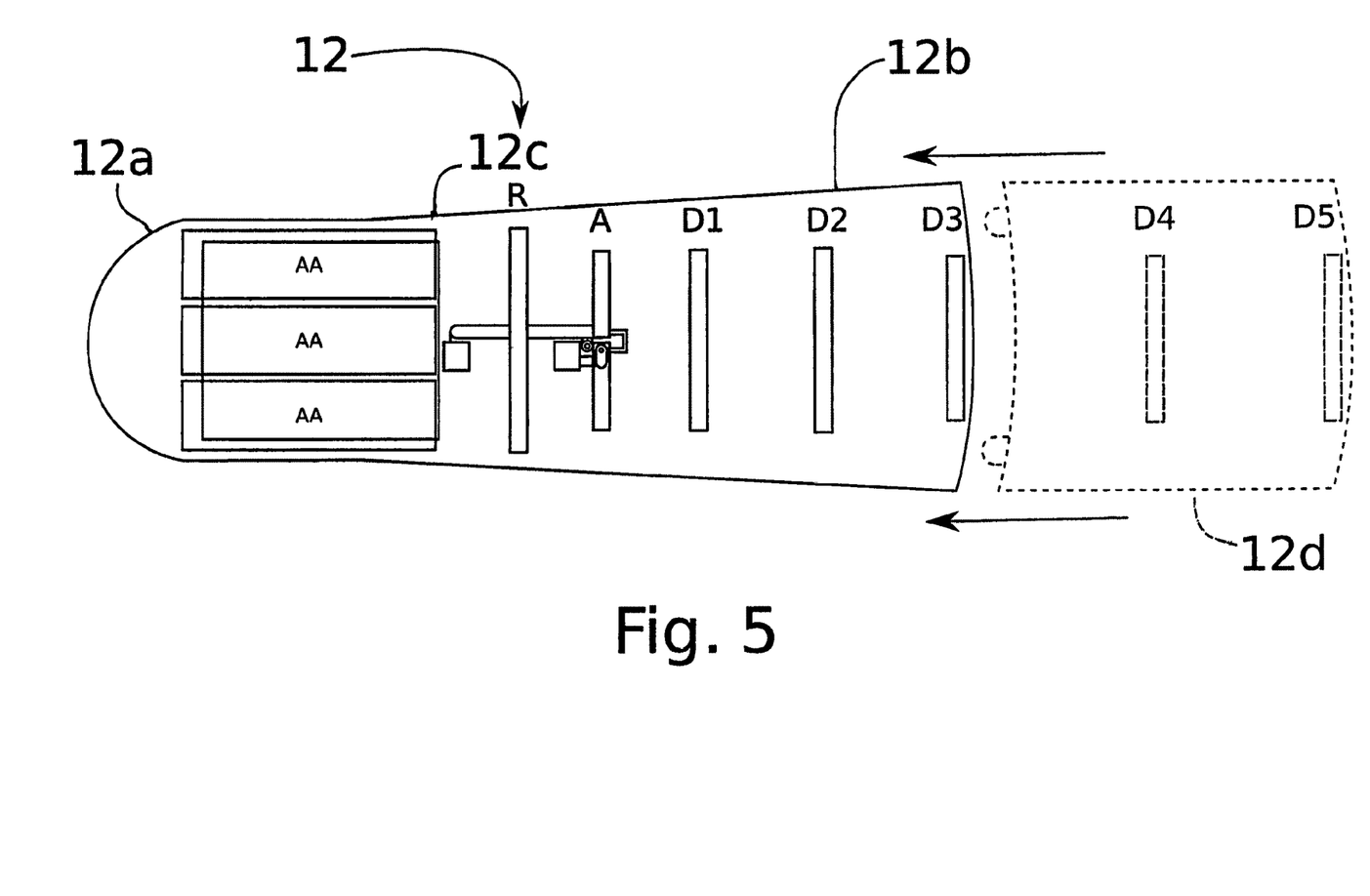
FIG. 5 is a somewhat schematic, top plan view of the tracker with extended, purchasable or retrofittable antenna array for enhancing its performance, in accordance with one embodiment of the invention.

Those of skill in the art will appreciate that certain add-ons or extensions can be provided as performance enhancements via various alternative mechanical embodiments one of which is illustrated in FIG. 5. For example, snap-fit or clip-on or flip-forward or telescopic antenna extenders can be provided that effectively extend the number of turns of the helical antenna or the number of deflectors of the Yagi array antenna, thereby to increase directivity performance of tracker 12 at added cost. Such snap-fit or clip-on or flip-forward or telescopic field or retrofit extensions are rendered possible by the use of antenna coupling components presenting an extendable outer edge or surface compatible with such extensions. Such antenna extensions permit increased flexibility in manufacturing cost, retail pricing, after-market sales, and the overall value proposition of the invention.

FIG. 5 will be understood somewhat schematically to illustrate tracker 12 as including a housing with a hand-grippable rearward portion 12a, an antenna-containing or -mounting forward portion 12b, and an electronics-containing middle portion 12c. Middle portion 12c can be seen to include three AA batteries and associated electronics including a Yagi array-type antenna having plural, planar reflector, active (driven) and director elements extending from a mast representing a central axis of the directional antenna. Within the regular housing are deflector elements D1, D2 and D3. An auxiliary housing 12d can optionally be provided that is snap-fittable or otherwise mountable on the outer end of the regular housing. Auxiliary housing 12d may be seen to contain further deflector elements D4 and D5, which effectively increase the gain of the antenna as described above. Those of skill in the art will appreciate that such an antenna extension can be provided in an after-market at added cost to boost overall beacon performance. The use of an auxiliary housing by a user of course is optional, and is easily achieved for attachment by a simple push-snap gesture or for detachment by a simple pull-unsnap gesture. The snap-fit or other attachment means preferably are a simple pair or more of aligned male and female components such as a cylindrical peg and a collar having a recess therein for interference-fit receiving of the peg, as is known.

Alternative arrangements, including a flip-hinge arrangement similar to a flip phone or a telescopic or extension ladder-like arrangement whereby concentric sections progressively extend when tugged and snap fit into detents at their proper segmented extensions are contemplated as being within the spirit and scope of the invention.

Figure 6A:
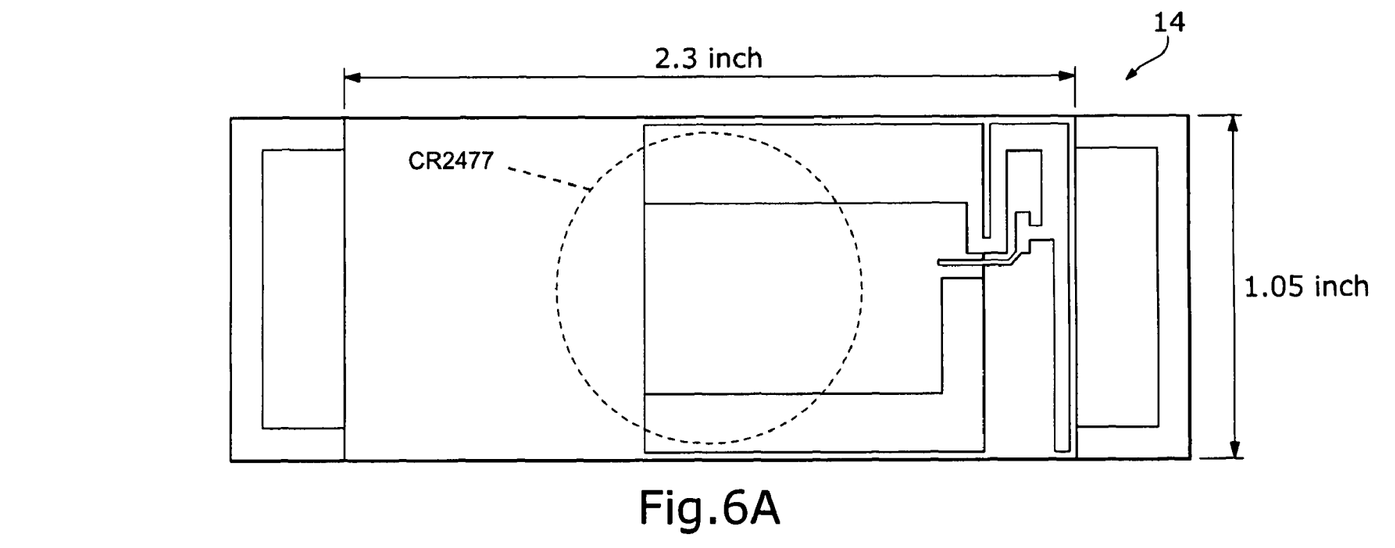
FIGS. 6A and 6B respectively are a top plan and an end elevational view of the beacon showing its layout, its tiny dimensions and its greater functional density, in accordance with one embodiment of the invention.
Figure 6B:
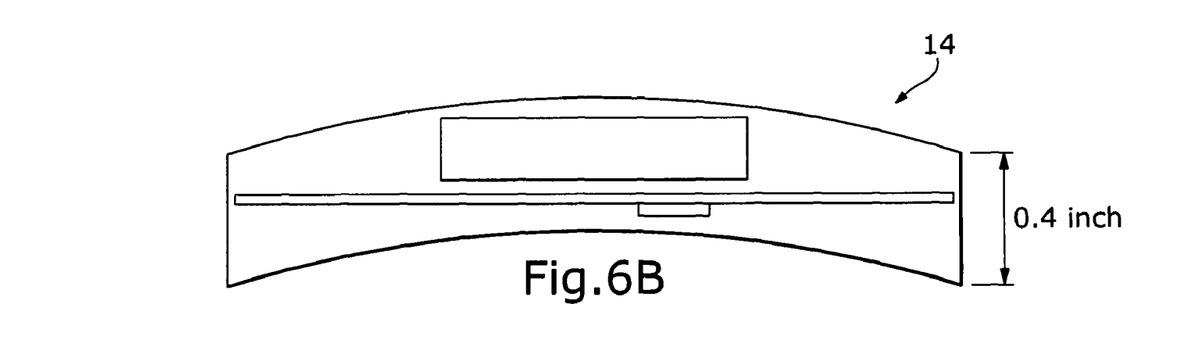

FIGS. 6A and 6B show beacon 14 in respectively in a top plan and end elevational view. It may be seen from FIG. 6A that a regular so-called Inverted-F antenna is used and the electronics spaced apart therefrom occupy only approximately half of the length of the beacon, with a coin cell battery such as CR2477 shown partly overlapping the circuitry in dashed outline. It may be seen from FIG. 6B that the battery fits within a housing the smallest dimension of which is only approximately 0.4 inch and that the radius of the circularly curved beacon is approximately 4 inchges. The overall dimensions of beacon 14 in this embodiment are 0.4 inch×1.05 inches×2.3 inches, with collar-end-receiving slotted capture members extending slightly therebeyond. Thus, those of skill in the art will appreciate that the overall volume occupied by beacon 14 is slightly less than 1.0 $in^3$.

Within the spirit and scope of the invention, different dimensions, circuitry, battery and antenna form factors and numbers and placements of components are contemplated. For example, two battery cells can be used in parallel to provide higher pulse current to the radio and to yield additional packaging flexibility. Or a different so-called omnidirectional microstrip antenna (OMA) such as a so-called meanderline Inverted-F-like antenna can be used for the beacon. Other alternatives are contemplated as being within the spirit and scope of the invention.

In use, the beacon is placed in a suitable location and turned on. Then the tracker is turned on. With the beacon in range, the green LED on the tracker flashes. If the green LED is not flashing, the user points the tracker straight ahead of him or her while rotating the user's body in a plane parallel to the ground until the green LED begins to flash. This indicates that the beacon is now in range. Once the flashing green LED is visible, the user can view the bar graph in the form of the columnar LED array to get an idea of the relative signal strength. More bars means more signal strength. The user slowly rotates left and right until the strongest signal is indicated. This represents the direction of the beacon relative to the tracker. The user simply walks in the direction of the strongest signal, continuously sweeping left and right to ensure maximum signal strength in the direction of the walk. When the bar graph fills the display or lights all LEDs in the signal strength array, the user knows he or she is within approximately twenty feet of the beacon. The beacon affixed to the lost object very quickly and efficiently is located by simply looking around, by use of the invention.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention. For example, the means to determine at least one of the determined direction and distance to the one or more beacons from the one or more trackers can include a triangulation technique, a pseudo-Doppler technique, a Watson-Wyatt technique, or another suitable technique.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A lost-object locating system comprising:
 a hand-grippable tracker configured repeatedly to emit a distinctive query signal therefrom; and
 a beacon affixable to an object subject to loss, the beacon configured repeatedly to transmit a response signal in response to the repeatedly emitted tracker query signal, the tracker including at least one directionally biased receiver antennae coupled therewith to determine in real time at least one of a relative distance and direction of the beacon relative to the tracker as a user navigates using the hand-grippable tracker.

2. The system of claim 1, wherein the tracker further includes a display indicating the at least one of a determined relative distance and direction of the beacon relative to the tracker.

3. The system of claim 2, wherein the operating range between the beacon and the tracker is greater than or equal to approximately 1.0 mile.

4. The system of claim 2, wherein the display includes two or more color coded lights.

5. The system of claim 1, wherein each of the at least one antenna is of a planar Yagi array type.

6. The system of claim 1, wherein each of the at least one antenna includes a conductor winding along a helical path around a transmission axis.

7. The system of claim 6, wherein each of the at least one winding is approximately elliptical in cross section.

8. The system of claim 7, wherein a ratio of the major to minor axis of the elliptical cross section is greater than approximately 3 to 1.

9. The system of claim 8, wherein the ratio is greater than Approximately 5 to 1.

10. The system of claim 1, wherein the tracker further includes at least one signal booster amplifier operatively coupled with the at least one antenna.

11. The system of claim 1, wherein the at least one antenna is two or more antennae configured to have angularly divergent central axes.

12. A lost-object locating apparatus comprising:
 one or more beacons each affixable to an object subject to loss and each configured repeatedly to transmit a signal substantially omni-directionally in response to a received query signal, and
 a hand-grippable tracker configured to emit a distinctive query signal therefrom, to receive each responsive signal transmitted from the one or more beacons and to determine the distance and direction of the one or more beacons from the tracker.

13. The apparatus of claim 12, wherein the range of the locating apparatus is greater than approximately 1.0 mile.

14. The apparatus of claim 12, wherein the apparatus includes a pairing mode of operation relative to the one or more beacons, and wherein the tracker is capable after the pairing of receiving differentiated signals from up to three of the one or more beacons, and wherein the tracker is capable of indicating both proximity and direction of the up to three of the one or more beacons relative to the tracker.

15. An object locating system comprising:
 one or more beacons each comprising a means to receive a distinctive query radio signal and a means to transmit a radio signal to a tracker in response to detecting the query signal;
 one or more portable and hand-grippable trackers each comprising a means to repeatedly transmit the distinctive query radio signal a means to receive responsive radio signal from the one or more beacons, a means to determine at least one of a direction and distance to the one or more beacons, and a means to indicate at least one of the determined direction and distance to the one or more beacons.

16. The system of claim 15, wherein the one or more beacons each is portable.

17. The system of claim 16, wherein the volume of each of the one or more beacons is less than approximately 2.5 cubic inches ($in^3$).

18. The system of claim 17, wherein the volume of each of the one of more beacons is less than approximately 1.5 in$^3$.

19. The system of claim 18, wherein the volume of each of the one or more beacons is less than approximately 1.0 in$^3$.

20. The system of claim 19, wherein the largest measurement in the narrowest dimension of each of the one or more beacons is less than approximately 0.5 inches.

21. The system of claim 20, wherein the largest measurement in the narrowest dimension of each of the one or more beacons is less than approximately 0.4 inches.

22. The system of claim 15, wherein each of the one or more trackers comprises a directional antenna, a power amplifier operatively coupled with the antenna, a microprocessor operatively coupled with the power amplifier, and a digital compass or accelerometer operatively coupled with the microprocessor to determine distance and direction of the one or more beacons.

23. The system of claim 15, wherein each of the one or more beacons is configured to be affixed to another object.

24. The system of claim 15 in which each of the one or more trackers includes a forward directional antenna portion, wherein each of the one or more trackers has a rearward hand-grippable portion located behind the directional antenna portion.

25. The system of claim 24, wherein each directional antenna portion includes a helical antenna tuned to receive at a defined nominal free-space wavelength $\lambda_0$, and wherein the circumference of the elliptical cross section of the antenna is dimensioned between approximately 0.75 $\lambda_0$ and 1.25 $\lambda_0$.

26. The system of claim 25, wherein the cross-sectional shape of the helical antenna is an ellipse.

27. The system of claim 26, wherein the eccentricity of the ellipse is between approximately 3 and 10.

28. The system of claim 24, wherein each directional antenna portion includes a helical antenna having a substantially uniform nominal winding pitch of between approximately 12 and 16 degrees.

29. The system of claim 24, wherein each directional antenna portion includes a helical antenna having a substantially uniform nominal winding pitch of approximately 14 degrees.

30. The system of claim 29, wherein each directional antenna portion includes a ground plane oriented substantially perpendicular to a major axis of the helical antenna.

31. The system of claim 30, wherein the ground plane is a part of a printed circuit board (PCB).

32. The system of claim 24, wherein each directional antenna portion includes a Yagi antenna tuned to receive at a defined nominal free-space wavelength $\lambda_0$, the Yagi antenna comprising plural spaced-apart Yagi elements comprising an active drive element, a passive reflector element and one or more passive director elements configured as plural conductors on an electrically isolated mast.

33. The system of claim 32, wherein the Yagi elements are patterned on a printed circuit board (PCB).

34. The system of claim 33 wherein the PCB further provides for electrical interconnections and mounting of transceiver electronics of the tracker.

35. The system of claim 34, wherein the Yagi elements and the electronics share a ground plane on the PCB.

36. The system of claim 35, wherein at least the drive element is coupled with the electronics in the form of a PCB transmission line.

37. The system of claim 34, wherein at least the drive element is coupled with the electronics in the form of a coaxial cable.

38. The system of claim 32, wherein the drive element is approximately 0.5 $\lambda_0$ in length.

39. The system of claim 32, wherein the reflector element is approximately 1.05 $\lambda_0$ in length.

40. The system of claim 32, wherein each of the one or more director elements is approximately 0.95 $\lambda_0$ in length.

41. The system of claim 32 in which there are plural adjacent pair-wise director elements, wherein a spacing between the pair-wise director elements is between approximately 0.1 $\lambda_0$ and 0.5 $\lambda_0$.

42. The system of claim 32, wherein a spacing between the drive element and the reflector element is between approximately 0.1 $\lambda_0$ and 0.25 $\lambda_0$.

43. The system of claim 32, wherein at least one of the one or more director elements is alternately removable and attachable by a user.

44. The system of claim 24, wherein each of the one or more trackers includes a plurality of antennae, wherein the means to determine is coupled with a plurality of signals received by the plurality of antennae.

45. The system of claim 44, wherein the means to determine includes a triangulation technique.

46. The system of claim 44, wherein the means to determine includes a pseudo-Doppler technique.

47. The system of claim 44, wherein the means to determine includes a Watson-Watt technique.

48. The system of claim 15, wherein each of the one or more trackers is configured to be affixed to another object.

49. The system of claim 15, wherein the beacon includes a substantially omnidirectional beacon antenna portion.

50. The system of claim 49, wherein the beacon antenna portion includes a substantially omnidirectional microstrip antenna (OMA).

51. The system of claim 49, wherein the beacon antenna includes an inverted-F antenna.

52. The system of claim 49, wherein the beacon antenna includes a meander line antenna.

53. The system of claim 15, wherein each of the one or more beacons is powered by one or more batteries.

54. The system of claim 53, wherein a charge status of the one or more beacon batteries is capable of being determined 55. The system of claim 54, wherein the determined charge status of the one or more beacon batteries is radio frequency (RF) transmitted to the each of the one or more trackers, and wherein the determined charge status of the one or more beacon batteries is annunciated at the one or more trackers.

56. The system of claim 55, wherein the one or more beacon batteries is at least one of rechargeable and replaceable.

57. The system of claim 15, wherein each of the one or more trackers is powered by one or more tracker batteries.

58. The system of claim 57, wherein a charge status of the one or more tracker batteries is capable of being determined.

59. The system of claim 58, wherein the determined charge status of the one or more tracker batteries is annunciated at the one or more trackers.

60. The system of claim 59, wherein the one or more tracker batteries is at least one of rechargeable and replaceable.

61. The system of claim 15, wherein each of the one or more trackers uses a unique beacon identification (ID) selectively to pair with only one and to ignore all other of the one or more beacons.

62. The system of claim 61, wherein each of the one or more trackers comprises a switch for user selection of which one beacon to locate.

63. The system of claim 62, wherein each of the one or more trackers comprises an indicator of which one beacon to locate.

64. The system of claim 63, wherein each of the one or more beacons comprises a beacon transmitter for transmitting the unique beacon ID as a packet of digital beacon data.

65. The system of claim 64, wherein the packet of digital beacon data is forward error corrected.

66. The system of claim 61, wherein each of the one or more beacons comprises a switch for user selection of which one tracker to respond to.

67. The system of claim 62, wherein each of the one or more beacons comprises an indicator of which one tracker it is selected to respond to.

68. The system of claim 63, wherein each of the one or more trackers comprises a tracker transmitter for transmitting the unique tracker identification (ID) as a packet of digital tracker ID data.

69. The system of claim 64, wherein the packet of digital tracker ID data is forward error corrected.

70. The system of claim 15, wherein each of the one or more beacons uses a unique tracker identification (ID) selectively to pair with only one and to ignore other of the one or more trackers.

71. The system of claim 15, wherein a plurality of the one or more trackers is used simultaneously to locate a plurality of the one or more beacons.

72. The system of claim 15, wherein each of the one or more trackers comprises a microprocessor and a radio.

73. The system of claim 72, wherein the microprocessor and radio are integrated into a single printed circuit board-mountable integrated circuit package.

74. The system of claim 15, wherein each of the one or more trackers is configured to receive a signal from each of the one or more beacons at a distance of more than approximately 1.0 mile.

75. The system of claim 15, wherein each of the one or more trackers is configured to identify each of the one or more beacons at a distance of more than approximately 1.0 mile.

76. The system of claim 15, wherein each of the one or more trackers comprises a means of determining a direction to each of the one or more beacons at a distance of at least approximately 50 feet.

77. The system of claim 76, wherein each of the one or more trackers comprises a means of indicating a direction to each of the one or more beacons.

78. The system of claim 77, wherein the means of indicating direction comprises a compass and a microprocessor for processing data therefrom and for monitoring antenna signal strength data.

79. The system of claim 77, wherein each of the means of indicating direction includes an analog meter.

80. The system of claim 77, wherein each of the means of indicating direction includes an array of plural lights.

81. The system of claim 77, wherein each of the one or more trackers further comprises a means of indicating a distance to each of the one or more beacons.

82. The system of claim 81, wherein each of the means of indicating distance includes an analog meter.

83. The system of claim 81, wherein each of the means of indicating distance includes an array of plural lights.

84. The system of claim 15, wherein each of the one or more means to transmit a query signal comprises a power amplifier in a transmit path.

85. The system of claim 84, wherein each of the one or more beacons comprises a wake-up transmit signal receiver and a means for awakening the beacon from a quiescent battery-save state.

86. The system of claim 15, wherein the query signal is used by the one or more beacons to awaken the beacon from a quiescent battery-save state.

87. The system of claim 15, wherein each of the one or more beacons includes a trigger circuit to awaken the beacon from a quiescent battery-save state, the trigger circuit being configured to be triggered by a signal from an invisible perimeter fence.

88. The system of claim 15, wherein each of the one or more trackers includes a low-noise amplifier in a receive signal path between an antenna and a microprocessor.

89. The system of claim 15, wherein signals passed between the one or more trackers and the one or more beacons are encoded as digital data.

90. The system of claim 89, wherein the digital data are conveyed at a variable rate.

91. The system of claim 90, wherein a higher data rate is used at a shorter range between the one or more trackers and the one or more beacons, and wherein a lower data rate is used at a longer range therebetween.

* * * * *